United States Patent
Tall et al.

(10) Patent No.: US 10,688,663 B2
(45) Date of Patent: Jun. 23, 2020

(54) AUTOMATION OF AIRFOIL PRESSURE TAPS FOR TESTING HOLES OF AN AIRFOIL

(71) Applicant: United Technologies Corporation, Farmington, CT (US)

(72) Inventors: Mary Lynn Tall, Rocky Hill, CT (US); Peggy Sansevero, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 172 days.

(21) Appl. No.: 15/886,259

(22) Filed: Feb. 1, 2018

(65) Prior Publication Data

US 2019/0232497 A1   Aug. 1, 2019

(51) Int. Cl.
| | |
|---|---|
| *B25J 9/16* | (2006.01) |
| *F01D 25/28* | (2006.01) |
| *G01M 99/00* | (2011.01) |
| *F01D 21/00* | (2006.01) |
| *B64F 5/60* | (2017.01) |

(52) U.S. Cl.
CPC ........... *B25J 9/1679* (2013.01); *B25J 9/1697* (2013.01); *F01D 21/003* (2013.01); *F01D 25/285* (2013.01); *G01M 99/00* (2013.01); *B64F 5/60* (2017.01); *Y10S 901/44* (2013.01); *Y10S 901/47* (2013.01)

(58) Field of Classification Search
CPC .......... B25J 9/1679; B25J 9/1697; B64F 5/60; Y10S 901/44; Y10S 90/47; G01F 1/34; G01J 5/02
See application file for complete search history.

(56) References Cited

U.S. PATENT DOCUMENTS

| | | |
|---|---|---|
| 7,679,746 B1 | 3/2010 | Walton |
| 8,215,159 B2 | 7/2012 | Kell et al. |
| 8,530,787 B2 | 9/2013 | Carter |
| 9,188,504 B2 | 11/2015 | Bezdecny et al. |
| 9,476,842 B2 | 10/2016 | Drescher et al. |
| 9,810,092 B2 | 11/2017 | Roberts et al. |
| 9,810,098 B2 | 11/2017 | Moore et al. |

FOREIGN PATENT DOCUMENTS

| | | |
|---|---|---|
| EP | 2339333 A1 | 6/2011 |
| WO | WO2011131263 A1 | 10/2011 |

OTHER PUBLICATIONS

Extended European Search Report for EP Application No. 19155137.3, dated Jun. 25, 2019, pp. 11.

*Primary Examiner* — Harshad R Patel
*Assistant Examiner* — Nigel H Plumb
(74) *Attorney, Agent, or Firm* — Kinney & Lange, P.A.

(57) ABSTRACT

An automated airflow inspection system for airfoil blades or vanes includes an operator station for mounting the airfoil and a robotic station for pressure tapping the airfoil. The robotic station includes a vision system and a pressure tapper mounted to a robotic arm. The vision system identifies a pattern of holes of the airfoil blade or vane. The system identifies a hole within the pattern of holes by comparing the pattern of holes to a pre-loaded program associated with the airfoil blade or vane. The system is monitored and controlled by a human to machine interface.

19 Claims, 5 Drawing Sheets

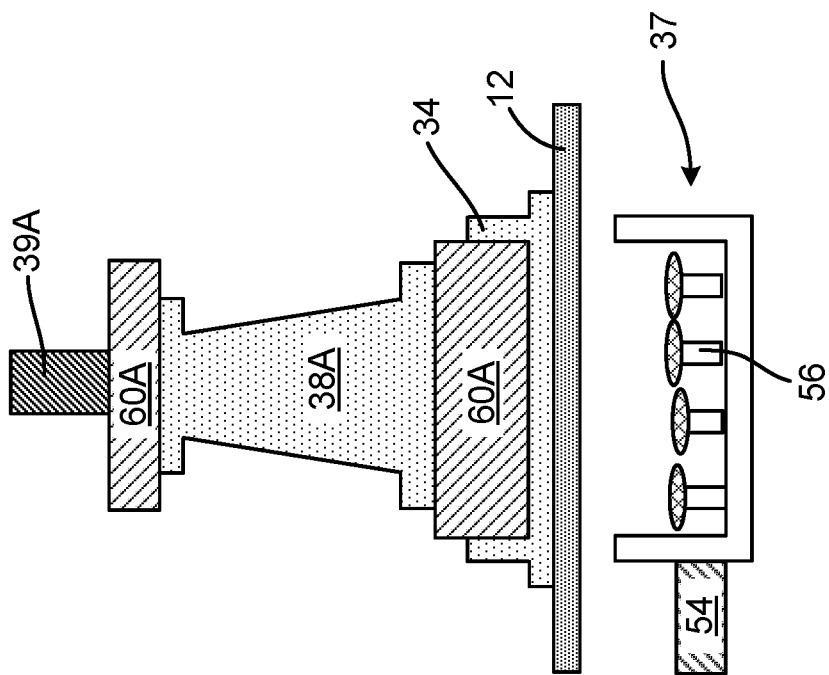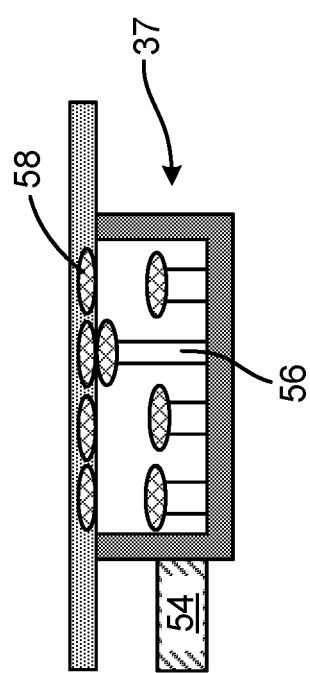

AUTOMATION OF AIRFOIL PRESSURE TAPS FOR TESTING HOLES OF AN AIRFOIL

BACKGROUND

This application relates generally to airfoil inspection and particularly to airflow inspection processes applied to turbine blades and vanes.

All turbines airfoils, both blades and vanes, must be inspected to ensure proper airflow through the airfoil. This is done through manual airflow inspection processes using pressure tappers. Each airfoil has specific pressure tap requirements that must be met during inspection. Pressure taps are used to measure the amount of air at a particular hole in an airfoil during inspection. Pressure taps work by aligning with a particular hole being tested and running air through the passages associated with that hole. The pressure tapper can then detect the airflow through the hole and associated passages, including the pressure of the airflow.

Pressure taps have been difficult to automate due to variations in airfoil casting, grind classes, and hole drill true positions, particularly in turbine vanes. Thus, current airflow inspection processes are dependent on human operators. The operator uses a pen-like probe to locate and cover the correct hole prior to pressure tapping the hole. The alignment and inspection process is time consuming and risk injuries to operators. Additionally, the process is difficult to normalize from operator to operator.

SUMMARY

An air flow pressure tap system includes a rotatable plate having a first side and a second side, a robotic station, an operator station accessible to a human operator, wherein the rotatable plate is secured such that rotation of the rotatable plate moves the mounting plates between the robotic station and the operator station, a valve system proximate the rotatable plate and configured to provide air flow to the rotatable plate, and an airflow system providing air flow to the valve system. Each of the first side and the second side of the rotatable plate includes a mounting plate configured to anchor an airfoil for pressure tapping. The robotic station includes a robotic arm for executing an airflow inspection of an aircraft part, a vision system for sensing a pattern of holes in the aircraft part, and a pressure tapper for testing individual holes in the pattern of holes in the aircraft part. The robotic arm includes a base portion anchoring the robotic arm to the robotic station, and a translatable portion. The vision system and the pressure tapper are mounted on the translatable portion of the robotic arm. The system further includes a controller in communication with the operator station, the robotic station, the mounting plate, and the airflow system, the controller configured to control the vision system, the robotic arm, the valve system, and the pressure tapper.

A method of air flow pressure tapping includes loading an airfoil and a mold onto a mounting plate, confirming location of the airfoil and the mold, rotating the airfoil and the mold proximate a robotic arm, finding a pattern of holes in the airfoil with a vision system mounted on the robotic arm, finding a first hole in the pattern of holes to pressure tap, flowing air into the first hole, and pressure tapping the first hole with a pressure tapper mounted on the robotic arm.

BRIEF DESCRIPTION OF THE DRAWINGS

FIGS. 2A-2C are a schematic view of a part and mold secured onto the automated air flow pressure tap system of FIG. 1.

DETAILED DESCRIPTION

This disclosure teaches an airflow inspection process using a pressure tapper and a vision system mounted on a robotic arm. The vision system allows the robotic arm to recognize patterns of holes on airfoils and properly align the pressure tapper for airflow inspection. The vision system allows for hole pattern recognition that compensates for variations in airfoil casting, grind class, or hole drill true positions, and ensure selection of the correct specific hole. The combination of the robotic arm and vision system allows for accuracy and repeatability in multiple pressure taps across several airfoils.

Figure 1:
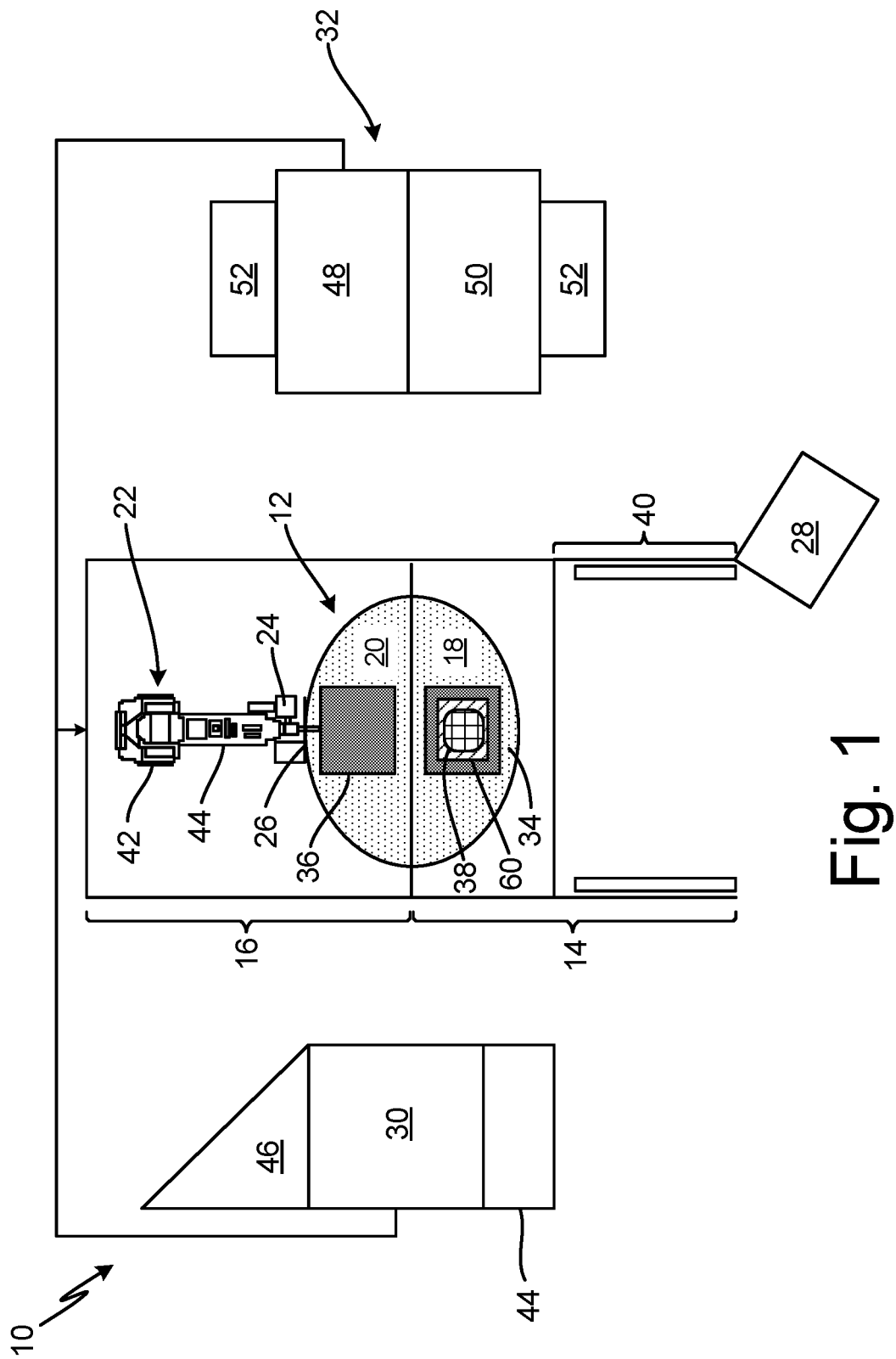
FIG. 1 is a schematic diagram of an automated air flow pressure tap system from a top-down view.

FIG. 1 shows automated air flow pressure tap system 10 from a top-down view. System 10 includes rotatable plate 12 that connects operator station 14 and robotic station 16. Rotatable plate 12 contains first side 18 and second side 20. Robotic station 16 includes robotic arm 22, vision system 24, and pressure tap 26. System 10 is connected to human to machine interface (HMI) 28, airflow system 30, and electrical system 32.

Rotatable plate 12, including first side 18 and second side 20, connects operator station 14 and robotic station 16. Second side 20 includes second mounting plate 34. Rotatable plate 12 can be rotated so that first side 18 and second side 20 switch places, each residing within either operator station 14 or robotic station 16. This allows for operation of system 10 within robotic station 16 at the same time a human operator is working in operator station 14.

On rotatable plate 12, each station 18, 20, has mounting plate 34. Mounting plates 34 is made to secure and hold airfoil 38 being inspected with airflow inspection system 10. Airfoil 38 is held in place by mold 60. Mounting plate 34 is in fluid communication with airflow system 30. A series of valves 37 and feed holes (shown in FIG. 2) are situated in robotic station 16 such that series of valves 37 aligns with mounting plate 34 when it is located in robotic station 16. Valve series 37 allows airflow from airflow system 30 through airfoil 38 by way of mold 60. Airflow through mounting plate 34 allows for pressure tapping of airfoil 38. Prior to pressure tapping, airfoil 38 must be secured and aligned to plate 34 at operator station 14.

Operator station 14 includes safe distance zone 40 and first side 18 of rotatable plate 12. Safe distance zone 40 is located in operator station 14. Safe distance zone 40 includes the area where a human operator can stand and work within system 10. A human operator in operator station 14 can also reach, read, and interact with HMI 28 (discussed in detail below). In operator station 14, a human operator can load an airfoil part onto mounting plate 34 of first side 18.

When an operator loads mold 60 and airfoil 38 onto mounting plate 34, he can check alignment along mounting plate 34 by hand. HMI 28 can verify which program should be loaded to correspond with mold 60. Once the operator has confirmed that airfoil 38 is correctly mounted, rotatable plate 12 can be rotated to move first side 18 into robotic station 16.

Robotic station 16 includes robotic arm 22 having base 42 and translatable portion 44, and vision system 24 and pressure tapper 26 mounted on robotic arm 22. Robotic arm 22 is mounted on base 42 within robotic station 16 to allow robotic arm 22 full access to airfoil 38 on rotatable plate 12. Robotic arm translatable portion 44, secured on base 42, can move around and work on airfoil 38 according to programmed instructions from HMI 28.

Vision system 24 allows robotic arm 22 to work on airfoil 38. Vision system 24 is mounted on translatable portion 44 of robotic arm 22. Vision system 24, which can be a camera, sees airfoil 38 mounted on mold 60 and mounting plate 34. Specifically, vision system 24 can detect the pattern of holes on airfoil 38. Vision system 24 communicates this pattern to HMI 28. Based on a pre-loaded program associated with the particular airfoil 38, vision system 24 and HMI 28 work to locate the specific hole that needs to be inspected. Vision system 24 can detect variations in specific airfoil vanes or blades, such as airfoil casting, grind class, or hole drill true positions. This is due to vision system 24 being used to detect the overall pattern of holes on airfoil 38 before locating a specific hole for inspection.

Pressure tapper 26 is used to pressure tap individual holes on airfoil 38 once vision system 24 has been used to locate a specific hole. Pressure tapper 26 is mounted on translatable portion 44 of robotic arm 22. Robotic arm 22 can move pressure tapper 26 to the specific hole, and align pressure tapper 26 at a consistent, accurate angle relative airfoil 38. Pressure tapper 26 can be attached to robotic arm 22 in a variety of configurations, including orthogonal to robotic arm 22, or parallel to robotic arm 22 (shown in FIGS. 4A-4B). Once aligned with the correct hole, pressure tapper 26 functions like a normal pressure tapper, detecting airflow and pressure within the specific hole on airfoil 38. Pressure tapper 26 reports its readings back an airflow gage in airflow system 30, which in turn communicates with HMI 28. When airflow system 30 communicates with HMI 28, it communicates that pressure tapper 26 is completed and system 10 can move to the next step.

In system 10, HMI 28 is physically mounted to operator station 14. HMI can have a different physical placement in other embodiments. HMI 28 is in communication with operator station 14, robotic station 16, rotatable plate 12 (including first side 18 and second side 20), airflow system 30, and electrical system 32. HMI 28 can also control or manipulate various aspects of these components. For example, HMI 28 can interact with the human operator in operator station 14 to determine if the airfoil is properly aligned when mounted onto rotatable plate 12, work with vision system 24 to detect patterns of holes in an airfoil and determine which specific hole needs to be pressure tapped, or work with robotic arm 22 to perform pressure tapping. While HMI 28 works with airflow system 30 to direct the beginning and end of each step during operation of system 10, airflow system 30 provides airflow to system 10 and interprets readings from pressure tapper 26.

HMI 28 can include one or more processors and computer-readable memory encoded with instructions that, when executed by the one or more processors, cause controller device 28 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Computer-readable memory of controller device 28 can be configured to store information within controller device 28 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller device 28 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories. HMI 28 can be a stand-alone device dedicated to the operation of the catalytic oxidation unit, or it can be integrated with another controller.

Airflow system 30 located below rotatable plate 12 within robotic station 16, and airflow system 30 is in communication with HMI 28. Airflow system 30 includes ducting (discussed in FIG. 2) that direct air to valve series 37, aligned with mounting plate 34 so that air can run through airfoil 38 during pressure tapping. Airflow system 30 can additionally include various filters, nozzles and sensors, such as particulate filters, temperature sensors, and pressure sensors that filter and monitor air prior to use in system 10 and after. Optionally, airflow system 30 includes access panels 44 and hinged door 46 for easy access. Airflow system 30 can be a commercially available airflow system.

Electrical system 32 is electrically connected to operator station 14, robotic station 16, rotatable plate 12 (including first side 18 and second side 20), HMI 28, and vision system 24. Electrical system 32 optionally includes main control panel 48, high voltage enclosure 50, and AC units 52. Electrical system 32 provides electrical power to components in system 10.

Figure 2C:
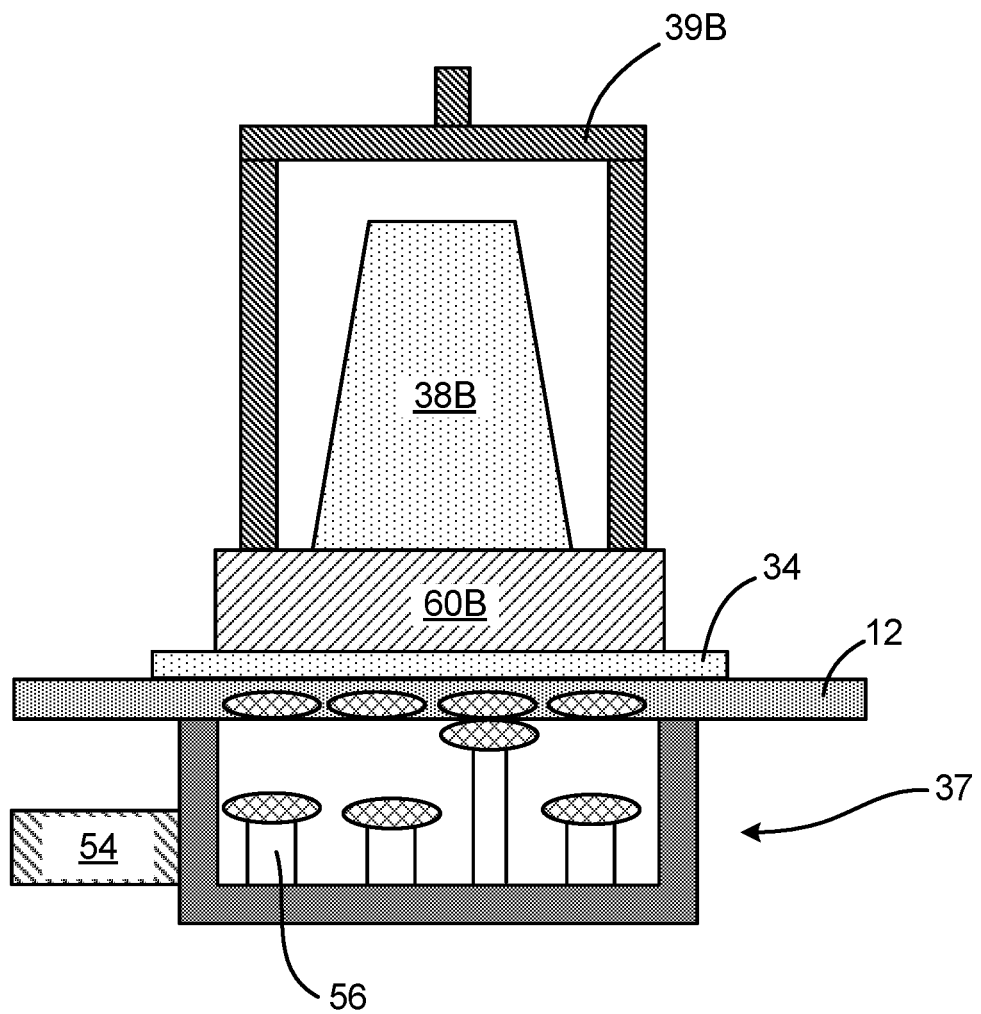

FIGS. 2A-2C are schematic views of valve system 37 and mounting plate 34 connected to ducting 54, valves 56, and air flow holes 58, with mold 60 and airfoil 38 secured onto the automated air flow pressure tap system 10 of FIG. 1. FIG. 2A shows valve system 37 without mounting plate 34 or airfoil 38. FIG. 2B shows valve system 37 and mounting plate 34 with airfoil vane 38A, while FIG. 2C shows valve system 37 and mounting plate 34 with airfoil blade 38B.

In FIG. 2A, valve system 37 is proximate rotatable plate 12. Valve system 37 includes ducting 54, valves 56, and airflow holes 58. Valve system 37 receives airflow from airflow system 30, and directs airflow through airfoil 38 as determined by opening and closing of valves 56 in alignment with airflow holes 58.

In FIG. 2B, airfoil vane 38A is secured in system 10 above valve system 37 on rotating plate 12 by mounting plate 34, clamp 39A, and molds 60A. Mounting plate 34, as described with reference to FIG. 1, is secured on rotatable plate 12. Mounting plate 34 allows for anchoring of airfoil 38A with repeatable alignment for pressure tapping. Ducting 54 in valve system 37 connects airflow system 30 to mounting plate 34 when system 10 is in operation and pressure tapping is occurring. Clamp 39A holds airfoil 38A in place on mounting plate 34 while pressure tapping is occurring.

Molds 60A provide a specific shape and attachment mechanism for airfoil 38 that allows for testing of the specific pattern of holes on airfoil 38. When functioning, valves 56 open and close holes 58. Depending on which mold 60A and airfoil 38A are secured to mounting plate 34 above valve system 37, different valves 56 will be opened or closed, sealing off some holes 58 for pressure tapping. Similarly, in FIG. 2C, airfoil blade 38B is secured in system 10 above valve system 37 on rotating plate 12 by mounting plate 34, clamp 39B, and mold 60B.

Figure 3:
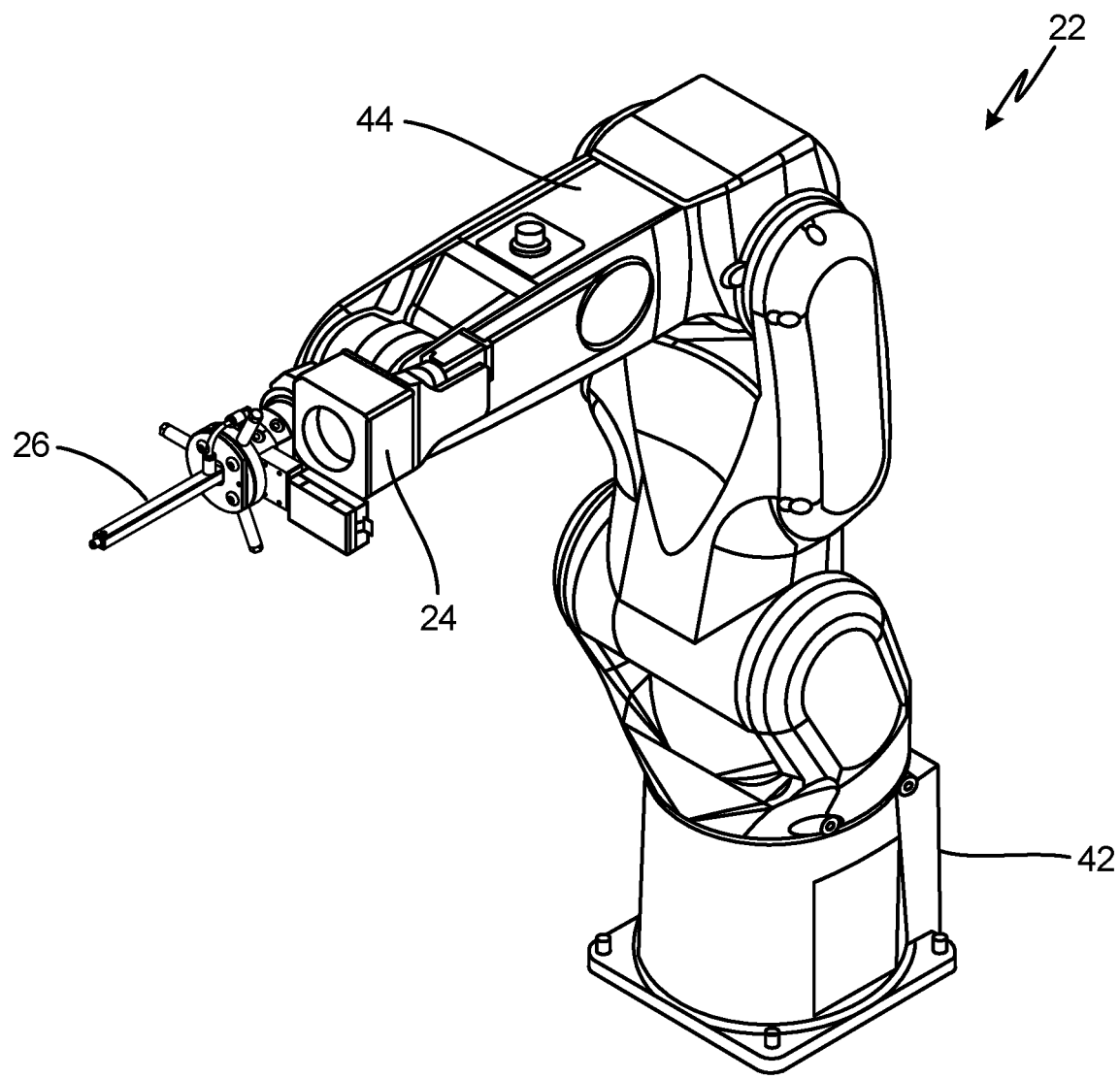
FIG. 3 is a perspective view of a robotic arm used in the automated air flow pressure tap system of FIG. 1.

FIG. 3 is a perspective view of robotic arm 22 used in the automated air flow pressure tap system of FIG. 1. Robotic arm 22 includes base 42 and translatable portion 44. Vision system 24 and pressure tapper 26 are mounted on translatable portion 44 of robotic arm 22. When system 10 is working, vision system 24 detects a pattern of holes on airfoil 38, and located a specific hole for pressure tapping. Translatable portion 44 of robotic arm 22 moves appropriately to align pressure tapper 26 with the specific hole. Pressure tapper 26 sends air to airflow system 30 to record pressure in that specific hole. Airflow system 30 takes the pressure reading. These actions are directed by and interpreted by HMI 28.

Figure 4A:
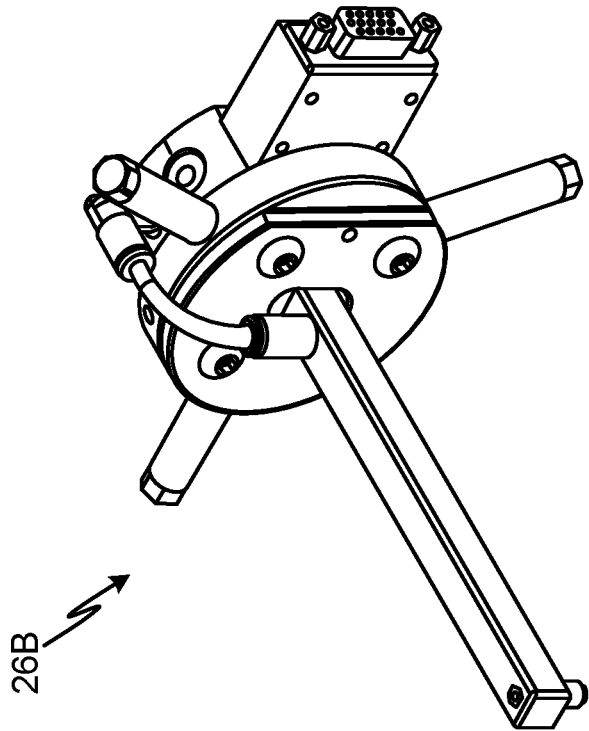
FIGS. 4A-4B are perspective views of a pressure tap tool for the automated air flow pressure tap system of FIG. 1 in varying embodiments.
Figure 4B:
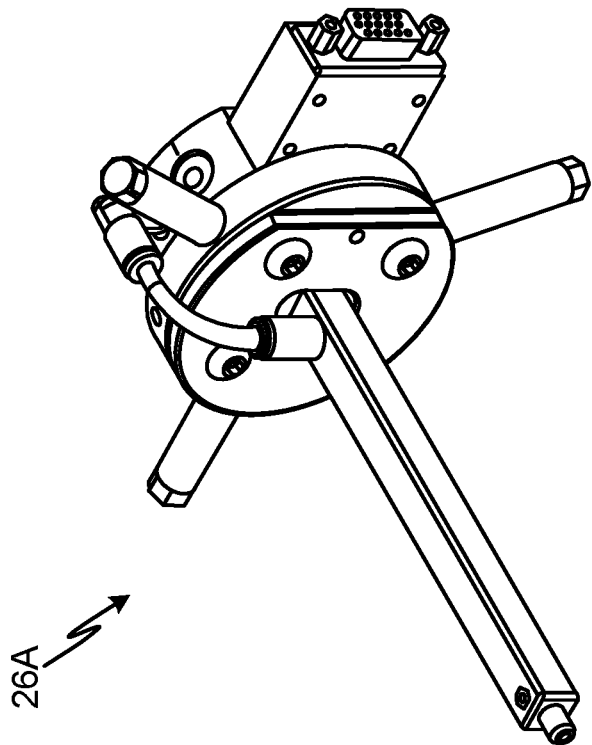

FIGS. 4A-4B are perspective views of pressure taper 26 for automated air flow pressure tap system 10 of FIG. 1 in varying embodiments. FIG. 4A shows pressure tapper 26A in a configuration that is 90 degrees relative to robotic arm 22. FIG. 4B shows pressure tapper 26B in a configuration that is straight relative to robotic arm 22. Each configuration of pressure tapper 26 allows for robotic arm 22 to reach and pressure tap holes in an airfoil that are in varying locations or positions.

System 10 works by combining vision system 24 with robotic arm controlled pressure tapping. First, in operator station 14, a human operator loads a mold for a specific airfoil 38 onto mounting plate 34 on first side 18 of rotatable plate 12. The operator then secures airfoil 38 onto the mold. The operator confirms alignment of the mold and airfoil 38. Once alignment is confirmed, the operator rotates first side 18 from operator station 14 to robotic station 16.

At robotic station 16, vision system 24 detects the pattern of holes on airfoil 38. In communication with HMI 28, vision system 24 determines which specific hole will be inspected. Robotic arm 22, directed by HMI 28, aligns pressure tapper 26 with the specific hole being inspected. Based on the specific hole being tested, valves 56 open or close to allow air to enter the specified cavity on airfoil 38 and then pressure tapper 26 transfers pressure exiting through the specified hole being tested. Airflow system 30 provides filtered air to mounting plate 34. Pressure tapper 26 transfers pressure to airflow system 30 through the specific hole being tested.

When inspection is complete, rotatable plate 12 can be rotated so that first position 18 is again the operator station 14. There, the human operator can disengaged airfoil 38 from the mold, and remove the mold from mounting plate 34. The process can then be repeated with another airfoil, either the same type or different, depending on which mold is attached to mounting plate 34.

The operations at operator station 14 and robotic station 16 can be performed simultaneously. Thus, a human operator can be loading an airfoil, checking airfoil alignment, or unloading an airfoil while robotic arm 22 is working to pressure tap an airfoil. Additionally, system 10 allows for minimization of injury to operators that are trying to align pressure tappers in awkward positioning.

Moreover, system 10 allows for repeatable pressure tapping of airfoils. Programmed robotic arms allow for consistent alignment of pressure tappers with holes in airfoils. Because the alignment is done by detecting an overall pattern of holes on an airfoil with a vision system, system 10 can account for airfoil variations such as casting, grind class, or hole drill true positions.

Discussion of Possible Embodiments

The following are non-exclusive descriptions of possible embodiments of the present invention.

An air flow pressure tap system includes a rotatable plate having a first side and a second side, a robotic station, an operator station accessible to a human operator, wherein the rotatable plate is secured such that rotation of the rotatable plate moves the mounting plates between the robotic station and the operator station, a valve system proximate the rotatable plate and configured to provide air flow to the rotatable plate, and an airflow system providing air flow to the valve system. Each of the first side and the second side of the rotatable plate includes a mounting plate configured to anchor an airfoil for pressure tapping. The robotic station includes a robotic arm for executing an airflow inspection of an aircraft part, a vision system for sensing a pattern of holes in the aircraft part, and a pressure tapper for testing individual holes in the pattern of holes in the aircraft part. The robotic arm includes a base portion anchoring the robotic arm to the robotic station, and a translatable portion. The vision system and the pressure tapper are mounted on the translatable portion of the robotic arm. The system further includes a controller in communication with the operator station, the robotic station, the mounting plate, and the airflow system, the controller configured to control the vision system, the robotic arm, the valve system, and the pressure tapper.

The system of the preceding paragraph can optionally include, additionally and/or alternatively, any one or more of the following features, configurations and/or additional components:

The system includes an electrical system in communication with the robotic station and the operating station. The electrical system includes a high voltage enclosure, a main control panel electrically connected to the high voltage enclosure, and one or more alternating current units, wherein the electrical system is configured to provide electricity to the robotic station and the operating station.

The system includes a remote input/output enclosure in communication with the electrical system and the robotic station.

The mounting plates are each configured to receive a mold for securing an airfoil.

The valve system comprises a plurality of feed holes.

The valve system comprises a plurality of valves configured to direct airflow through the aircraft part, and wherein each of the plurality of valves aligns with one of the plurality of feed holes.

The valve system is configured so that a single feed hole is open during operation of the air flow pressure tap system.

The air flow system comprises a plurality of sensors selected from the group consisting of pressure sensors, temperature sensors, nozzles, and flow sensors.

The air flow system comprises one or more air filters.

The vision system comprises a camera.

The pressure tapper is mounted 90 degrees relative to the robotic arm.

The pressure tapper is mounted straight relative to the robotic arm.

A method of air flow pressure tapping includes loading an airfoil and a mold onto a mounting plate, confirming location of the airfoil and the mold, rotating the airfoil and the mold proximate a robotic arm, finding a pattern of holes in the airfoil with a vision system mounted on the robotic arm, finding a first hole in the pattern of holes to pressure tap, flowing air into the first hole, and pressure tapping the first hole with a pressure tapper mounted on the robotic arm.

The method of the preceding paragraph can optionally include, additionally and/or alternatively, any one or more of the following features, configurations and/or additional components:

Loading the airfoil and the mold onto a first position is done by an operator.

Rotating the airfoil and the mold is done with a human to machine interface.

Pressure tapping the first hole comprises flowing air through the mold and the airfoil and sensing the pressure of the first hole.

The method includes pressure tapping a plurality of holes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air flow pressure tap system comprises:
   a rotatable plate having a first side and a second side, each of the first side and the second side comprising a mounting plate configured to anchor an airfoil for pressure tapping;
   a robotic station comprising:
      a robotic arm configured to execute an airflow inspection of an aircraft part, the robotic arm comprising:
         a base portion anchoring the robotic arm to the robotic station; and
         a translatable portion extending from and movable with respect to the base portion;
      a vision system mounted on the translatable portion of robotic arm, the vision system configured to sense a pattern of holes in the airfoil; and
      a pressure tapper mounted on the translatable portion of the robotic arm and configured to test individual holes in the pattern of holes in the airfoil;
   an operator station accessible to a human operator, wherein the rotatable plate is secured such that rotation of the rotatable plate moves the mounting plates between the robotic station and the operator station;
   a valve system located proximate the rotatable plate, the valve system configured to provide air flow to the rotatable plate;
   an airflow system configured to provide air flow to the valve system; and
   a controller in communication with the operator station, the robotic station, the mounting plate, the airflow system, and the valve system, the controller comprising one or more processors and computer-readable memory encoded with instructions that, when executed by the one or more processors, cause the controller to:
      detect the pattern of holes in the airfoil with the vision system; and
      find a first hole in the pattern of holes to pressure tap by comparing the pattern of holes to a pre-loaded program associated with the airfoil.

2. The system of claim 1, further comprising an electrical system in communication with the robotic station and the operating station, the electrical system comprising:
   a high voltage enclosure;
   a main control panel electrically connected to the high voltage enclosure; and
   one or more alternating current units, wherein the electrical system is configured to provide electricity to the robotic station and the operating station.

3. The system of claim 2, further comprising a remote input/output enclosure in communication with the electrical system and the robotic station.

4. The system of claim 1, wherein the mounting plates are each configured to receive a mold for securing an airfoil.

5. The system of claim 1, wherein the valve system comprises a plurality of feed holes.

6. The system of claim 5, wherein the valve system comprises a plurality of valves configured to direct airflow through the aircraft part, and wherein each of the plurality of valves aligns with one of the plurality of feed holes.

7. The system of claim 5, wherein the valve system is configured so that a single feed hole is open during operation of the air flow pressure tap system.

8. The system of claim 1, wherein the air flow system comprises a plurality of sensors selected from the group consisting of pressure sensors, temperature sensors, nozzles, and flow sensors.

9. The system of claim 1, wherein the air flow system comprises one or more air filters.

10. The system of claim 1, wherein the vision system comprises a camera.

11. The system of claim 1, wherein the pressure tapper is mounted 90 degrees relative to of the robotic arm.

12. The system of claim 1, wherein the pressure tapper is mounted straight relative to the robotic arm.

13. A method of air flow pressure tapping comprises:
   selecting a mold specific to an airfoil;
   loading the airfoil and the mold onto a mounting plate;
   confirming location of the airfoil and the mold;
   rotating the airfoil and the mold proximate a robotic arm;
   finding a pattern of holes in the airfoil with a vision system mounted on the robotic arm;
   finding a first hole in the pattern of holes to pressure tap by comparing the pattern of holes to a pre-loaded program associated with the airfoil;
   flowing air into the first hole; and
   sensing a flow rate and a pressure of the air flowing through the first hole at the pressure tapper.

14. The method of claim 13, wherein loading the airfoil and the mold onto a first position is done by an operator.

15. The method of claim 13, wherein rotating the airfoil and the mold is done with a human to machine interface.

16. The method of claim 13, wherein flowing air into the first hole comprises flowing air through the mold and the airfoil.

17. The method of claim 13, further comprising pressure tapping a plurality of holes.

18. The method of claim 13, and further comprising:
   flowing air into the pressure tapper through a second hole; and
   sensing a flow rate and a pressure of the air flowing through the second hole at the pressure tapper.

19. The method of claim 18, and further comprising:
moving the pressure tapper from the first hole to the second hole according to the pattern of holes identified by the vision system.

* * * * *